UNITED STATES PATENT OFFICE.

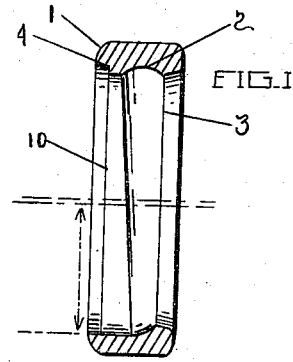
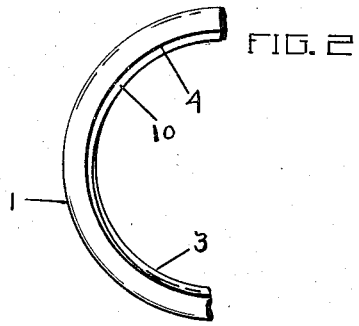
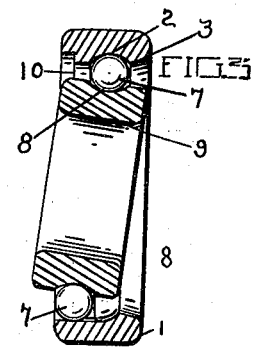
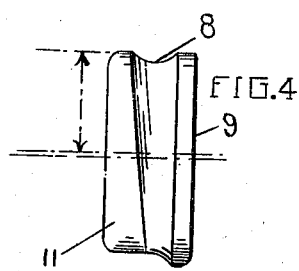
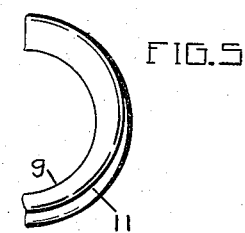
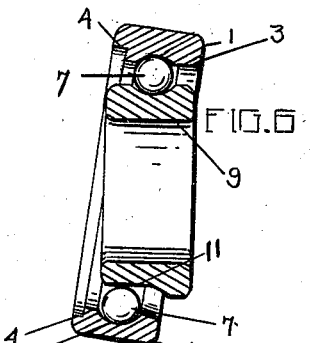
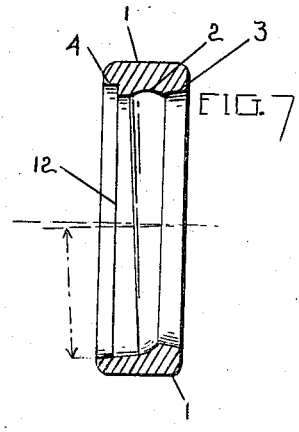
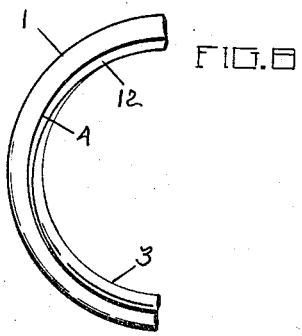
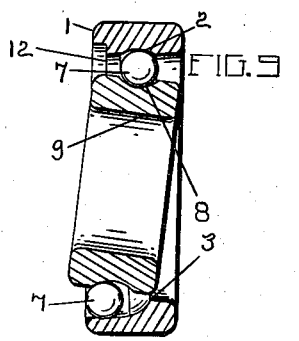
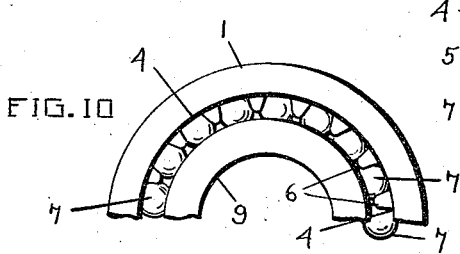
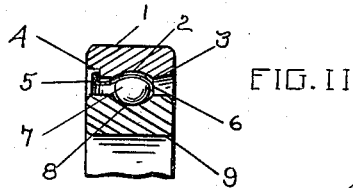

GEORGE E. KIRK, OF TOLEDO, OHIO, ASSIGNOR, BY MESNE ASSIGNMENTS, TO THE WILLYS-MORROW COMPANY, INC., A CORPORATION OF OHIO.

BEARING.

1,299,579.        Specification of Letters Patent.        Patented Apr. 8, 1919.

Application filed September 3, 1915. Serial No. 48,793.

*To all whom it may concern:*

Be it known that I, GEORGE E. KIRK, a citizen of the United States of America, residing at Toledo, Lucas county, Ohio, have invented new and useful Bearings, of which the following is a specification.

This invention relates to antifriction devices and particularly to ball bearing units, involving features of simplified construction and assembly, as well as stability in use under excessive strains and stresses.

Referring to the drawings:

Figure 1 is a section through an outer member or ring element showing one embodiment of the invention therein;

Fig. 2 is a fragmentary side elevation of the ring of Fig. 1;

Fig. 3 is a section through a bearing including the outer ring element of Fig. 1, and an inner ring with the parts grouped for wedging into fully assembled relation;

Fig. 4 is a view in elevation of an inner bearing member or ring element constructed according to the invention herein described;

Fig. 5 is a fragmentary side elevation of the ring of Fig. 4;

Fig. 6 is a section through a bearing including the inner ring member of Fig. 4, and an outer ring with the parts grouped for wedging into fully assembled relation;

Fig. 7 is a section through an outer member or ring element showing a modification in which the endless wedge is inclined;

Fig. 8 is a fragmentary side elevation of the ring of Fig. 7;

Fig. 9 is a section through a ball bearing including the inclined wedge element of Fig. 7, and an inner ring parts being grouped for forcing into fully assembled relation;

Fig. 10 is a fragmentary side elevation of a completed bearing unit; and

Fig. 11 is a cross-section thereof.

The outer member or ring element 1 is provided with the circular groove 2 having the uniform height side wall 3. In its opposite side, the member 1 has the clearance way 4 for the spacer 5 having fingers 6 disposed between the balls 7 to hold them just out of opposing rubbing contact in bearing operation. The balls 7 travel in the groove 8 of the inner member or ring element 9, as well as in the groove 2 of the element 1, which grooves and balls in the assembled structure are in a common plane at right angles to the axis of the grooves. The grooves are concentric and held so spaced by the balls 7.

The provision of these endless ball races or grooves affords a simplified antifriction construction effective to carry heavy loads. In producing the bearings in quantity, reducing the number of operations is a material factor in keeping down cost, while in adding to the advantages of the device, as well as reducing the number of operations, the value of the structure is further enhanced.

In forming the member 1, say from tubular stock, a single operation by a surface of revolution forms the side wall 10 for the groove 2. This side wall 10 varies continuously in height from zero, or its point of disappearance at the bottom or root of the groove 2, to its point of maximum attainment diametrically opposite its point of disappearance. Accordingly there is a continuous gradually varying height wall uniformly extending around the groove. This wall 10 is an endless annular wedge, truly wedging in assembly grouping, as shown in Fig. 3, wherein the face 10 is slightly inclined to the plane of the ball holding groove 8. The radius of generation of the surface 10 is less by one half of the height of the wall 3 than the radius of the root of the groove 2.

This specially formed side wall on the outer bearing ring may be formed on the inner member 9, instead, as shown in Figs. 4 to 6 inclusive, by providing the side wall 11 for the groove 8, this side wall extending from a point of disappearance or minimum height at the base of the groove 8 to a maximum diametrically opposite the minimum, makes the diameter of this cylinder greater than the diameter of the root of the groove 8 by one normal side wall height. The outer member 1 with the balls 7 fully grouped in the groove 2 and disposed in the full depth portion of the groove 8, leaves the surface 11 inclined to the plane of the groove 2, during assembly, as shown in Fig. 6 for wedge action of this cylindrical surface 11 formed eccentrically of the axis of the groove 8.

The pitch of the wedge may vary with groove depths and ball sizes, even to the extent of departing from the parallel axis showing of the cylindrical wedge face as to the axes of the elements 1 and 9. This inclination of the axis of the cylindrical wedge as to the axis of the groove 2 is shown by the surface of revolution 12 in Fig. 7 having as its radius half the distance from the root of the groove 2 to the diametrically opposite height of wall 3, when the maximum height of wall 12 is desired to conform to the uniform height of the wall 3. With well filled grooves, even this supplemented pitch for the wedging angle may be augmented in bearing units which run snugly, by raising the temperature of the outer member 1 at the time of assembly.

With the balls and members assembled in a common plane, the spacer 5 may have its fingers thrust between the balls 7 and bent inward to uniformly distribute the balls.

The annular wedge wall is continuous, with entire absence of abrupt contour variations in its circular extent, thereby providing a maximum strength side wall with a minimum of material. Further, in forcing the elements together, the balls 7 are all free to adjust themselves about the grooves.

These cuts or ball feeding wedges, being of greater diameter than the groove root diameter, and departing from groove root diameter at least the height of one side wall of the groove insure continuity of wedge action in assembling and leave a groove side wall of configuration to effectively withstand axial strains. At no point does the cut have an abrupt joinder in merging into a groove side wall, and there is accordingly, no corner weakness introduced. The maximum height of the cut containing wall may be the tube wall from which the ring is produced, and as variation occurs from the outer ring cuts to decrease diameter, and from inner ring cut to increase, the extent of this normal tube face wall height increases. The wedge face is cylindrical and the contour is for continuity of wedge action in assembling with the balls free to travel and seek their positions between the planes of the groove roots, and thus automatically adjust themselves for minimum strains in forcing the rings into assembled relation.

What is claimed and it is desired to secure by Letters Patent is:

1. An annular ball bearing groove forming element having a varying height side wall to the groove, the height of which side wall is determined by a single cylindrical surface of revolution inclined as to the axis of the bearing.

2. An annular ball bearing element having side walls forming therebetween a circular groove, one of said side walls having its height determined by a single cylindrical surface of revolution eccentric to the groove and having its axis inclined to intercept the axis of the bearing.

3. An annular ball bearing element having side walls forming therebetween a circular groove, the height of a side wall being determined by a cylinder eccentric to the groove on an axis intercepting the axis of the bearing.

4. An annular ball bearing element having side walls forming therebetween a circular groove having an axis, the height of a side wall being determined by a cylinder inclined to the axis of the groove.

5. A radial ball bearing comprising a pair of concentric way forming members, a side wall of one of the ways gradually attaining full height point from a point of disappearance, the face of said wall being cylindrical and inclined as to the axis of the bearing, and antifriction balls in said ways spacing the members.

6. A device of the class described comprising the combination of a pair of concentric bearing rings provided with facing ball races; and a plurality of balls disposed in said races; one side wall of one of said races being determined by a cylindrical surface of revolution having its axis inclined to the axis of said rings.

7. A device of the class described comprising the combination of a pair of concentric bearing rings provided with facing ball races; and a plurality of balls disposed in said races; one side wall of one of said races being so formed as to gradually and continuously vary in height from zero to a maximum.

8. A device of the class described comprising the combination of a pair of concentric bearing rings provided with facing ball races; and a plurality of balls disposed in said races; one side wall of one of said races being so formed as to continuously vary in height from zero to a maximum, the point of maximum height being diametrically opposite the point of zero height.

9. An annular bearing ring provided with a groove forming a ball race and bounded, on one side, by a continuous, uninterrupted wall and, on the other side, by a wall of continuously varying height determined by a cylindrical surface of revolution having its axis inclined to the axis of the ring.

10. An annular bearing ring provided with a groove forming a ball race and bounded, on one side, by a continuous, uninterrupted wall and, on the other side, by a wall varying continuously in height from zero to a maximum.

11. An annular bearing ring provided with a groove forming a ball race and bounded, on one side, by a continuous, uninterrupted wall and, on the other side, by a wall varying continuously in height from zero to a maximum, the point of maximum height being diametrically opposite the point of zero height.

In witness whereof I affix my signature.

GEO. E. KIRK.